(12) United States Patent
Gazeau et al.

(10) Patent No.: US 7,806,493 B2
(45) Date of Patent: Oct. 5, 2010

(54) ROBOT FOR LARGE-FORMAT, THREE DIMENSIONAL DIGITAL PRINTING ON A FIXED SURFACE AND PRINTING METHOD INVOLVING AT LEAST ONE SUCH ROBOT

(75) Inventors: Jean-Pierre Gazeau, Chatellerault (FR); Jean-Paul Lallemand, Saint-Benoit (FR); José Gabriel Ramirez Torres, Poitiers (FR); Saïd Zeghloul, Tercé (FR)

(73) Assignees: Centre National de la Recherche Scientifique (CNRS), Paris (FR); Universite de Poitiers, Futuroscope Chasseneuil Cedex (FR)

( * ) Notice: Subject to any disclaimer, the term of this patent is extended or adjusted under 35 U.S.C. 154(b) by 966 days.

(21) Appl. No.: 10/579,502

(22) PCT Filed: Nov. 19, 2004

(86) PCT No.: PCT/FR2004/050608

§ 371 (c)(1),
(2), (4) Date: Oct. 20, 2006

(87) PCT Pub. No.: WO2005/051668

PCT Pub. Date: Jun. 9, 2005

(65) Prior Publication Data
US 2007/0062383 A1    Mar. 22, 2007

(30) Foreign Application Priority Data
Nov. 24, 2003   (FR)  .................................. 03 50891

(51) Int. Cl.
*B41J 25/308*   (2006.01)

(52) U.S. Cl. ............................................ 347/8; 347/2

(58) Field of Classification Search ...................... 347/8
See application file for complete search history.

(56) References Cited

U.S. PATENT DOCUMENTS

| | | | | |
|---|---|---|---|---|
| 6,443,058 | B1* | 9/2002 | Stadler et al. | 101/23 |
| 6,939,407 | B2* | 9/2005 | Kawase et al. | 118/680 |
| 2001/0017085 | A1 | 8/2001 | Kubo et al. | |
| 2002/0070988 | A1* | 6/2002 | Desormeaux | 347/8 |

FOREIGN PATENT DOCUMENTS

| | | |
|---|---|---|
| EP | 0 970 811 A1 | 1/2000 |
| WO | 03/031081 A1 | 4/2003 |
| WO | 2004/016438 A1 | 2/2004 |

* cited by examiner

*Primary Examiner*—Matthew Luu
*Assistant Examiner*—Brian J Goldberg
(74) *Attorney, Agent, or Firm*—Buchanan Ingersoll & Rooney PC

(57) ABSTRACT

The invention relates to a robot for large-format, three-dimensional printing on a fixed surface, using five powered spindles. The inventive robot comprises an inkjet printing block, means for moving and orienting said printing assembly along several axes, at least one unit for controlling said means and a device for drying the ink sprayed onto the surface. According to the invention, the aforementioned movement and orientation means comprise: a support having three degrees of freedom in translation, which is used to position the printing assembly by enabling translational movements along horizontal, vertical and depth axes; and a wrist having two degrees of freedom in rotation, which is used to position and orient the printing assembly by enabling same to rotate in relation to two perpendicular axes. The invention also relates to a method of using said robot.

19 Claims, 11 Drawing Sheets

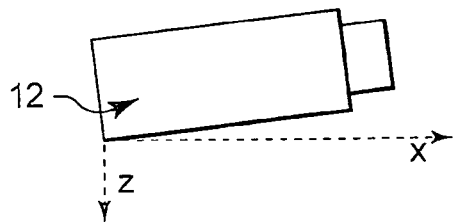
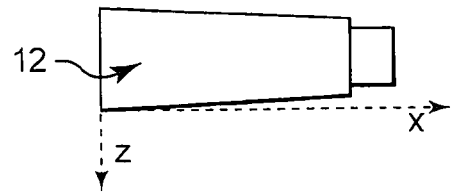
FIG. 2a          FIG. 2b
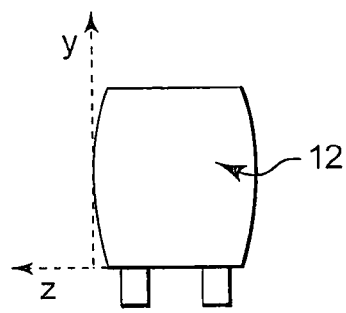
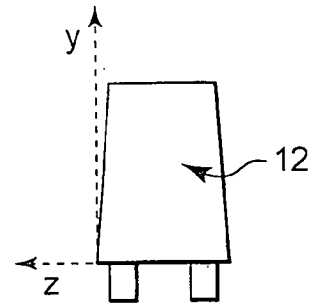
FIG. 3a          FIG. 3b
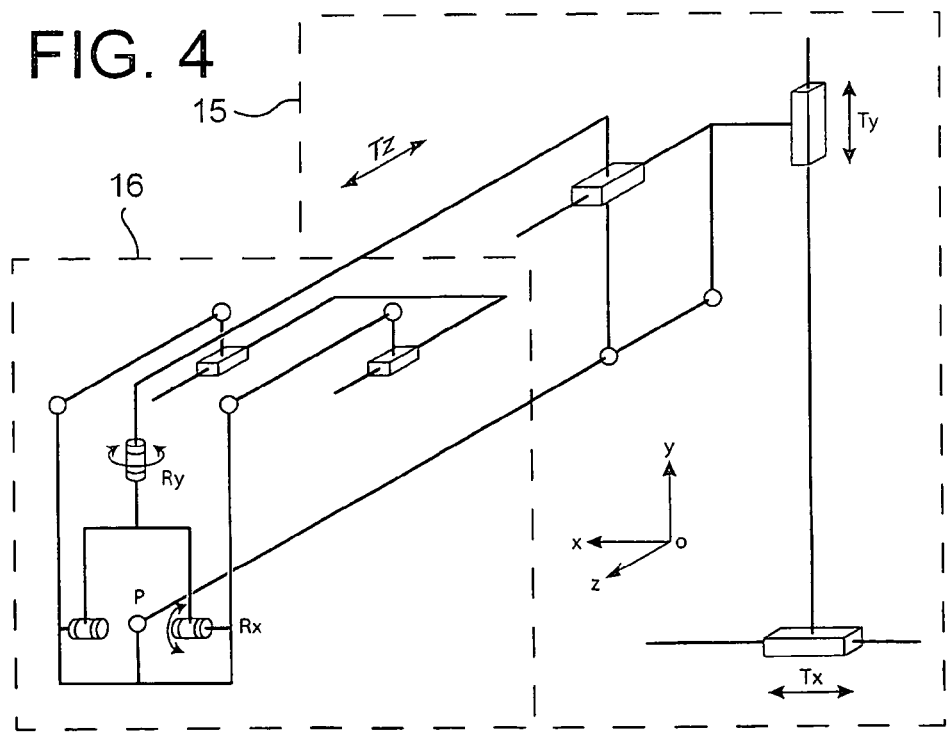
FIG. 4

ROBOT FOR LARGE-FORMAT, THREE DIMENSIONAL DIGITAL PRINTING ON A FIXED SURFACE AND PRINTING METHOD INVOLVING AT LEAST ONE SUCH ROBOT

CROSS-REFERENCE TO RELATED APPLICATIONS

This application is the U.S. national stage of International Application No. PCT/FR2004/050608, filed Nov. 19, 2004 and claims priority under 35 U.S.C. §119 of Application No. 03/50891, filed in France on Nov. 24, 2003.

TECHNICAL AREA

The present invention concerns a robot for digital, large format, three-dimensional printing on a fixed surface and a process using at least said robot. The particular area of the invention is vehicle graphics, e.g. printing on trucks, coaches, wagons, planes.

STATE OF THE PRIOR ART

Some prior art large format printers provide for the direct, automatic printing of a large format, digitized image on a consumable adhesive medium of paper type, or roll of tarpaulin. In the latter case, the consumable is unrolled as and when printing progresses, and the printhead is animated by a uniform rectilinear movement.

In the more particular area of vehicle wraps, this kind of printing requires immobilisation of the vehicle for several days. Once the medium is printed, it is then positioned on and fixed to the vehicle. This type of printing can be performed as follows either manually by a painter, directly onto the consumable medium. In this case the cost is obviously high.

or digitally, e.g. on the plastic tarpaulin of a trailer which can be dismounted and packed in a roll.

Said printing technique has numerous disadvantages, in particular high cost and a high number of operations to be conducted.

Other prior art documents give consideration to printing on vehicles.

The document referenced [1] at the description end, describes a device provided with a printhead with which it is possible to decorate large-size objects. These objects may be walls or vehicles. This printhead is mounted on means that are mobile in the three dimensions along the surface to be decorated. It comprises a frame in which multiple printing elements are arranged, in four rows. The print elements in one same row allow for the spraying of one same colour, whether ink or acrylic paint. When in operation, the printing elements are permanently fed with colour via conduits connected to the frame. The printing elements are mounted to be individually mobile, sliding in the frame via motorised systems controlled by a computing device connected to a shape sensor. This shape sensor determines the surface relief to be printed and commands movement of the printing elements so that their end parts, which comprise the spray nozzles, are at all times at the same distance away from the surface.

The document referenced [2] describes an automatic paint robot to paint the outside surface of a motor vehicle for example. This device comprises spray heads for different inks, means to control the movement of these heads in a direction $\vec{Ox}$, means for controlling movement along a direction $\vec{Oy}$ and means for controlling movement along a direction $\vec{Oz}$ with respect to the surface to be painted, making it possible to maintain a constant distance between the surface to be painted and said heads. In this document, the heads follow the profile of the surface to be painted but do not change their orientation to maintain parallelism with the surface. The robot solely has depth-wise surface following. This means that at certain points, the distance from the surface is different for each of the four heads. In addition, this profile following requires a depth reading process with respect to the surface prior to the printing process. This reading process is conducted automatically by means of a mechanical feeler. This produces a meshing (whose fineness depends upon the complexity of the surface) which describes this depth at different points. This reading process can take dozens of minutes.

The object of the invention is to simplify the prior art robots by proposing a print robot with five motorised axes making it possible to print a surface with no prior dismounting, using inkjet printing technology to reduce costs, and digital technology in order to be able to print any image or photo irrespective of complexity. With this invention ink drying on the medium is instantaneous; there is therefore no additional immobilisation time for drying.

DESCRIPTION OF THE INVENTION

The invention concerns a robot for large format three-dimensional printing on a fixed surface, comprising an inkjet printing assembly, means for displacing and orienting this printing assembly along several axes, at least one control unit to control these means and a drying device to dry the ink sprayed onto said surface, characterized in that said robot is a print robot with five motorised axes, and in that these displacement and orientation means comprise:

a carrier with three degrees of freedom in translation, to ensure positioning of the printing assembly allowing its horizontal, vertical and depth translation, a wrist with two degrees of freedom in rotation which supports and ensures the orientation of the printing assembly, allowing rotations thereof along two perpendicular axes.

Advantageously the carrier comprises:

a first mobile carriage provided with a driving system moving on two horizontal rails and, a beam fixed perpendicular to the first mobile carriage, a second mobile carriage provided with a driving system moving on two vertical rails mounted on this beam, a slide fixed perpendicular to the second mobile carriage, a mobile platform moving along this slide.

Advantageously the wrist comprises two identical screw/rod/crank systems each linked to a mobile carriage.

Advantageously, the wrist carries an ink drying device. One major element in the design of the robot is the original parallel mechanism used: advantageously it offers two rotations corresponding to the fourth and fifth axes of the print robot.

With this system it is possible to bring the rotation axes very close to the surface of the printheads. Hence the rotation of the printing assembly with respect to axis $\vec{Oy}$ is made about an invariant point P of the surface of the printing assembly. This avoids having to couple the axes of the carrier with the rotation command for axis $\vec{Oy}$.

Advantageously, the robot comprises five servomotors respectively associated with the five axes of this robot. It may comprise, as input:

several optical sensors to measure the distance between the printing assembly and the surface to be printed, five encoders of the motor axes to determine the movement of the servomotors, two end of travel sensors and a start point sensor respectively associated with each axis of the robot.

Advantageously the robot comprises a real-time control device including:

a central unit module,
at least one module to control the axes,
a digital input-output module.

Advantageously the robot comprises a general control device which includes:

a real-time control module,
a sensor signal interface/relay and packaging module,
a supply/instrumentation module,
a brake feed module,
a safety management module,
a ventilating assembly,
five digital motor speed controllers.

Advantageously the robot comprises:

a first computer terminal dedicated to control of this robot's movements,
a second computer terminal dedicated to robot monitoring, comprising:
coordination between robot displacement and printing operations,
processing of the digital image to be printed,
man-machine interfacing.

Advantageously the printing assembly comprises at least one printing block provided with several printheads using inks of different colours. Each printing block may comprise four printheads respectively using yellow, cyan, magenta and black inks. The inks may be ultraviolet-drying inks.

The invention also concerns a printing process using at least one robot such as defined above which, after a prior image digitization step and dividing of the image into strips of determined width, comprises the following steps:

positioning a medium with respect to the robot(s),
initial setting of the robot(s) and positioning their heads with respect to the surface of the medium, at the point where printing of the image is to start,
printing the image with successive printing of the different vertical strips forming the image,
return to a rest configuration.

Advantageously this process comprises a prior surface preparation step to make it clean and uniformly white.

Advantageously printing starts at the lower left-hand corner of the surface, and the width of the vertical strips is approximately 7 cm.

Unlike the document referenced [2] cited above, the inventive robot is able to follow a profile whilst maintaining parallelism with the surface by means of the two wrist joints which can be used to change the orientation and angle of incline of all the printheads. In addition, no prior reading process is required. The inventive robot has a set of laser sensors enabling it to follow the surface of the medium in real time. This surface following is performed so as to maintain a constant printing speed on the surface (speed control).

The inventive robot can be used to print on numerous types of surfaces, e.g. planar or cylindrical truck trailers, walls. The kinematics of the printing assembly, which has spatial movement, allows adaptation of its movement to the shape of the surface to be printed.

With the inventive robot it is possible to consider direct printing on walls for example, billboards, by positioning the print robot on a vehicle platform.

The development prospects of the inventive robot are therefore numerous in terms of possible applications. In the area of vehicle graphics, printing becomes possible within a maximum time of two hours (considering for example a truck with a surface to be printed of 18 m×3 m) if two robots are used either side of this vehicle, whereas such printing up until now required much longer immobilisation, the final estimated costs being much higher for the customer.

The technology used in the inventive robot allows automatic printing of a digital image on a surface in three dimensions with a print quality of 180 dpi in 16 million colours. The quality can be extended to 360 dpi with a double pass. The ultraviolet ink used (UV) allows printing on varied media: tarpaulin, painted sheet metal, painted wall. An integrated drying device provides for instantaneous drying on the medium.

The sphere of potential applications of the invention is extensive having regard to the importance given to image in a world in which communication lies at the forefront, in particular in the advertising sector.

BRIEF DESCRIPTION OF THE DRAWINGS

FIGS. 2a and 2b illustrate the use of a rotation Ry of axis $\vec{Oy}$ of the inventive robot, FIGS. 3a and 3b illustrate the use of a rotation Rx of axis $\vec{Ox}$ of the inventive robot, FIG. 4 schematically illustrates the kinematics of the carrier of the inventive robot.

DETAILED DESCRIPTION OF PARTICULAR EMBODIMENTS

Figure 1:
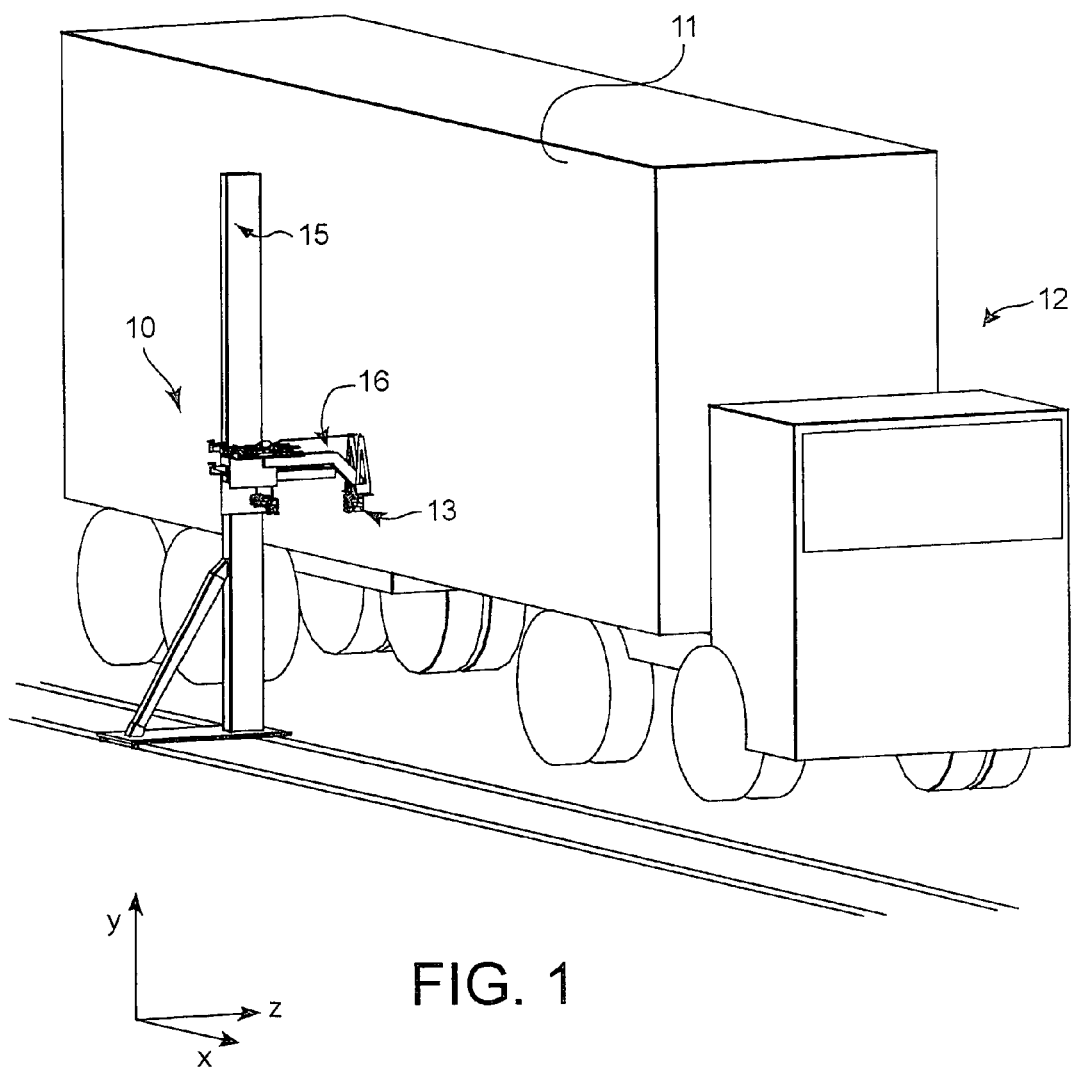
FIG. 1 illustrates the digital print robot of the invention.

The inventive robot 10 is a print robot with five motorised axes: three in translation and two in rotation. This robot 10 can move and orientate in space a printing assembly 13 comprising at least one printing block 18 provided with several inkjet printheads 14, e.g. four heads respectively spraying yellow, cyan, magenta and black inks onto the surface 11 of a medium 12 to be printed which remains fixed.

The kinematics of this robot are designed to be as simple as possible. They have recourse to commercially available products (transfer axes, controls, . . . ) that are commonly used.

FIG. 1 illustrates the inventive robot 10 used for three-dimensional printing on the surface 11 of a medium 12, e.g. the outer surface 11 of a truck 12.

This print robot 10 comprises:

a printing assembly 13 comprising at least one printing block 18 provided with inkjet printheads 14, of different colours for example, a carrier 15 with three degrees of freedom in translation which ensures positioning of the printing assembly 13 allowing its horizontal (Tx), vertical (Ty) and depth (Tz) translation, a wrist 16 with two degrees of freedom which ensures orientation of the printing assembly 13 allowing its rotations (Rx, Ry) along two perpendicular axes.

For the carrier 15:

The first translation Tx along axis $\vec{Ox}$ enables the robot 10 to travel along the entire length of the surface 11: this is the robot's first axis, The second translation Ty along axis $\vec{Oy}$ enables the robot 10 to move over the height of the surface: this is the robot's second axis, The third translation Tz along axis $\vec{Oz}$ enables the robot's arm to move towards or away from the surface 11 to follow a deformation of this surface or to correct a positioning error thereof: this third robot's axis provides the robot 10 with the third degree of freedom allowing for three-dimensional printing.

For the wrist 16:

The first rotation Ry of axis $\vec{Oy}$, which corresponds to the fourth axis of the robot 10, is used to orientate the printing assembly 13 to correct a positioning error of surface 11 or to ensure the following of an inclined planar surface along axis $\vec{Ox}$, as illustrated FIGS. 2a and 2b.

The second rotation Rx of axis $\vec{Ox}$, which corresponds to the fifth axis of the robot 10, allows orientation of the printing assembly 13 to ensure the following of a non-planar surface along axis $\vec{Oy}$ or an inclined surface, as illustrated FIGS. 3a and 3b.

The kinematical schematic of the inventive robot 10 illustrated FIG. 4, evidences these three translations Tx, Ty and Tz and these two rotations Rx and Ry.

The following travel pathways are therefore possible with the example of printing on trucks, the joint parameters being denoted qi, i=1 to 5:

$$0 \text{ mm} \leq q1 \leq 19000 \text{ mm}(Tx)$$

$$0 \text{ mm} \leq q2 \leq 4000 \text{ mm}(Ty)$$

$$-250 \text{ mm} \leq q3 \leq 250 \text{ mm}(Tz)$$

$$-10° \leq q4 \leq 10°(Ry)$$

$$-20° \leq q5 \leq 20°(Rx).$$

It is to be noted that these travel pathways for parameters q1 and q2 are not limited, they may be increased so that on the same bases it is possible to have a robot able to print on larger surfaces. The variations in parameters q1 and q2 (e.g. 19000 mm and 4000 mm) correspond to the maximum dimensions of the surfaces to be printed increased by 1 meter. Since printing is performed at constant speed, an acceleration and deceleration zone is provided for axis q2. For parameter q1, this additional distance makes it possible to overcome a positioning error, or provides the opportunity of disengaging the robot to take up a stowed-away position for example. The limit stops of parameter q3 are defined in relation to the maximum permissible error for positioning medium 12. Parameters q4 and q5 are used solely for adjusting the orientation of the print robot 10. Their values remain low, the limit stops of parameter q5 being wider, making it possible to print on convex surfaces.

To implement this robot 10, the truck 12 can for example be parked by its driver on a print area. Ground markings and guides can be provided to assist this operation. A sufficiently large free space may be provided at each end of the robot to enable the driver to position the vehicle without having to manoeuvre.

When the truck 12 is in position, a mechanism consisting of elevators (of hydraulic jack type) and a level can be used to ensure the horizontality of the vehicle. Adjustment could be controlled manually. Hence a single target is sufficient to define the reference points of the truck.

Mechanical Construction of the Robot 10

1) Mechanics of the Carrier 15

On the carrier 15 of the robot 10 it must be possible to place on-board all the robot controlling means, and all the printing and ink drying means. This structure can be entirely made with aluminium sections.

Figure 5A:
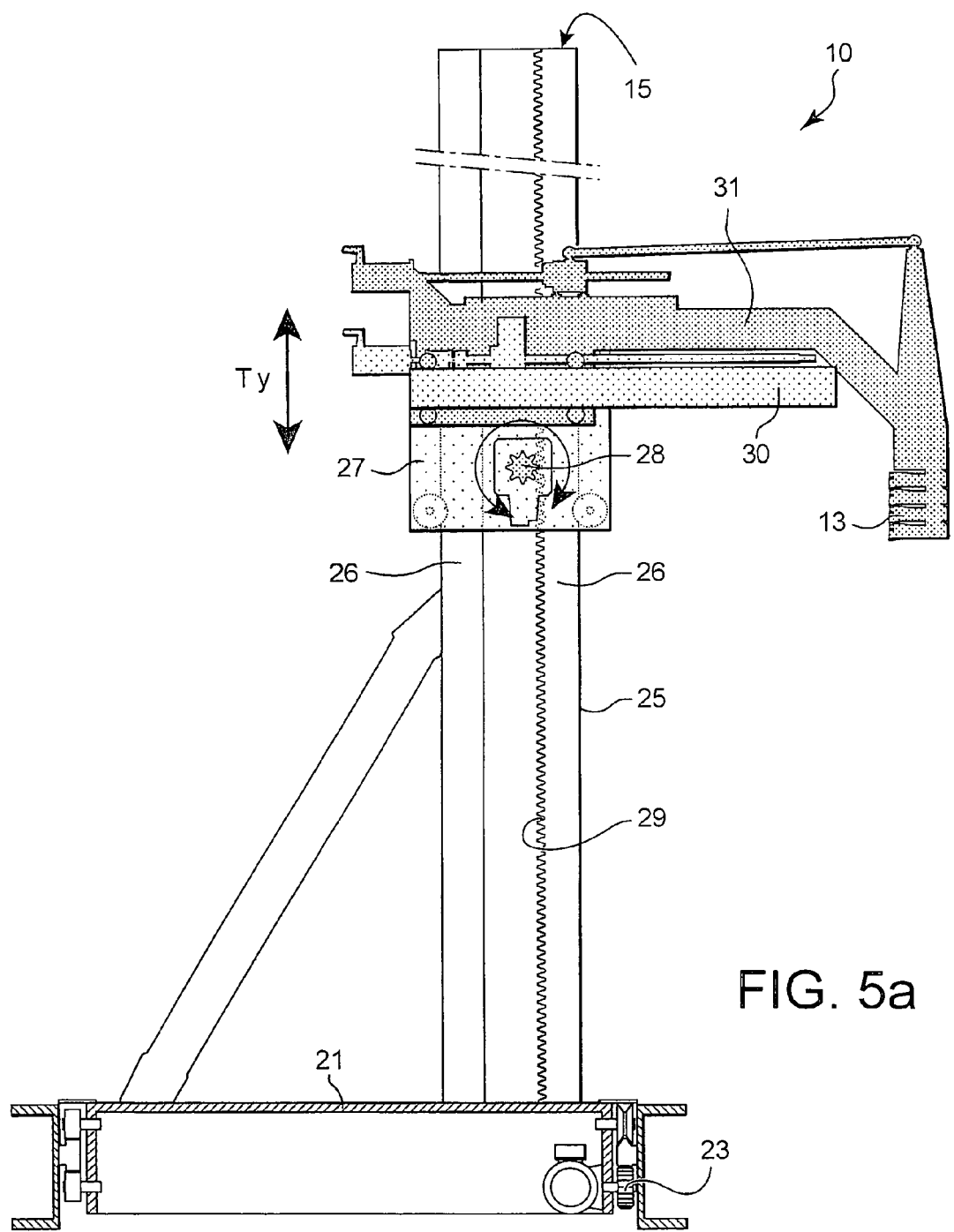
FIGS. 5a and 5b illustrate a side view and an overhead view of the inventive robot, with its wrist orientation.
Figure 5B:
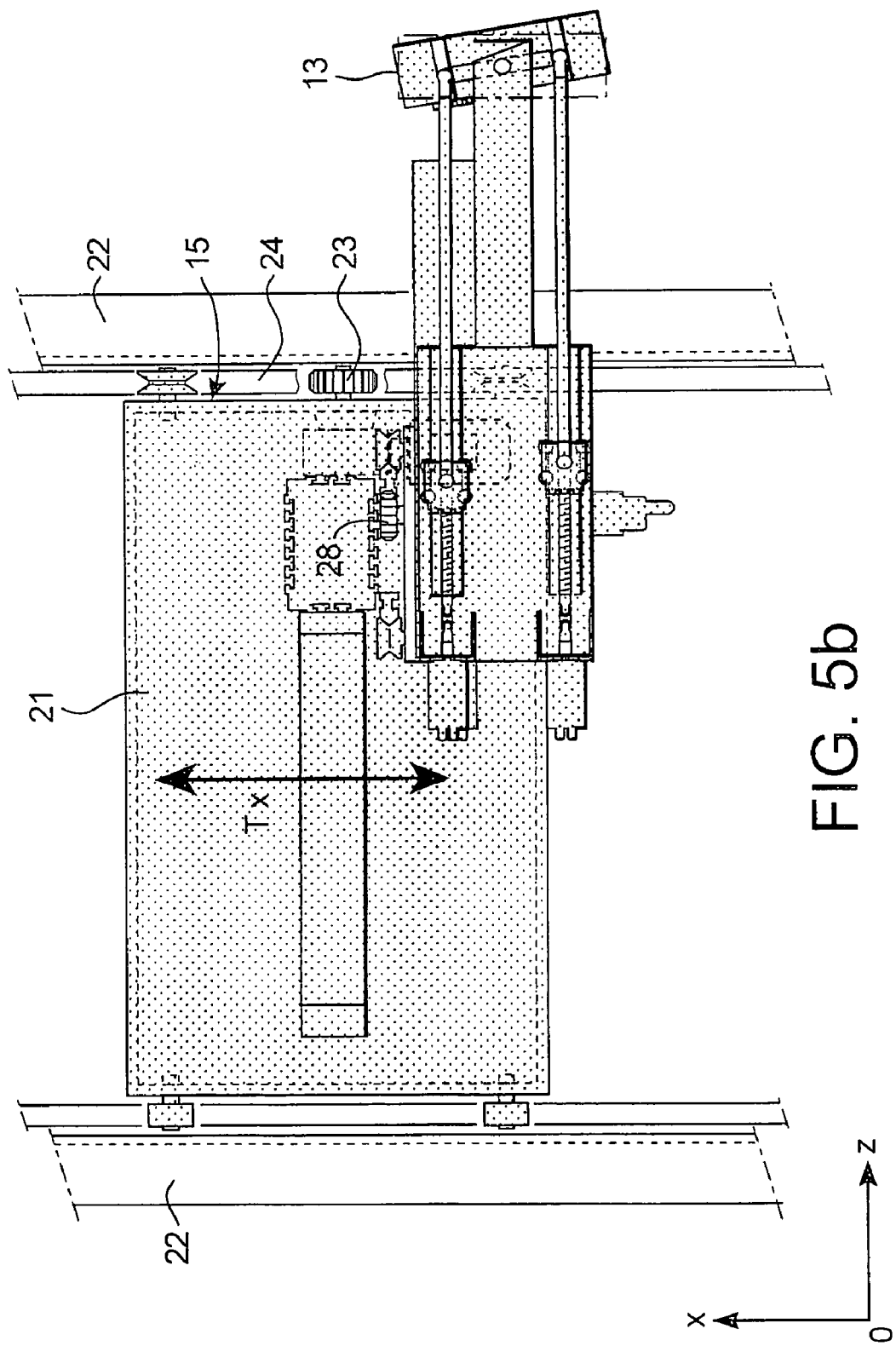

As illustrated FIGS. 5a et 5b, the carrier 15 comprises three identified parts for each of the axes of the robot 10:

First Part (First Axis)

This first part comprises a mobile carriage 21, which forms the basis of the robot 10. This carriage 21 is supported for example by four flat rollers. Stud type track rollers may be positioned facing the other rollers to ensure non-derailing of the carriage 21. This carriage 21 moves along two horizontal rails 22. The driving system may consist of a driver sprocket 23 mounted on the mobile carriage and of a gear rack 24 fixed to one of the rails.

Second Part (Second Axis)

This second part comprises a beam 25 four meters long for example, specially designed to withstand heavy loads, which is fixed perpendicular to the mobile carriage 21. Two vertical rails 26 are mounted on this beam 25. A mobile carriage 27 moves along rails 26, for example via four 'v' rollers. The driving system may consist of a driver sprocket 28 mounted on the mobile carriage and a gear rack 29 fixed to one of the rails. Demand is placed on this axis during the printing process. Trued rails may be used with lower machining tolerances.

Third Part (Third Axis)

This third part comprises a slide 30, 0.8 meters long for example, which is fixed perpendicular to carriage 27 of the second part, via an offset part. A mobile platform 31, supported by four rollers for example, moves along this slide 30. A screw-nut system ensures the driving of platform 31.

The first part of the carrier ensures the displacement of the printing assembly 13 along axis $\vec{Ox}$, i.e. horizontal displacement parallel to the plane of printing. The travel distance of this displacement along the first axis may reach 18 meters or more.

The second part ensures vertical displacement of the printing assembly 13 along axis $\vec{Oy}$. This printing assembly 13 is installed directly on the carriage 27 of the second part.

The third part ensures displacement in depth along axis $\vec{Oz}$ making it possible to adjust the distance between the surface to be printed 11 and the printing assembly 13.

2) Mechanics of the Wrist 16

Figure 6:
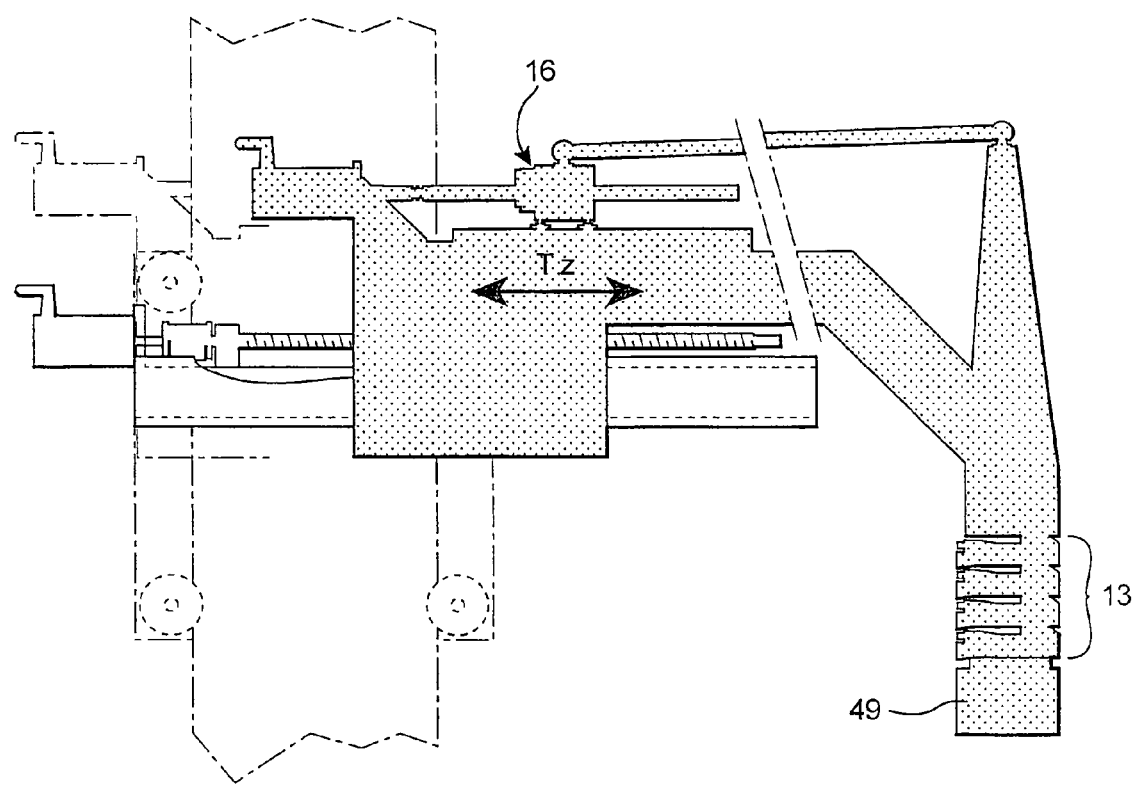
FIGS. 6 to 8 illustrate this wrist and its operation.
Figure 7:
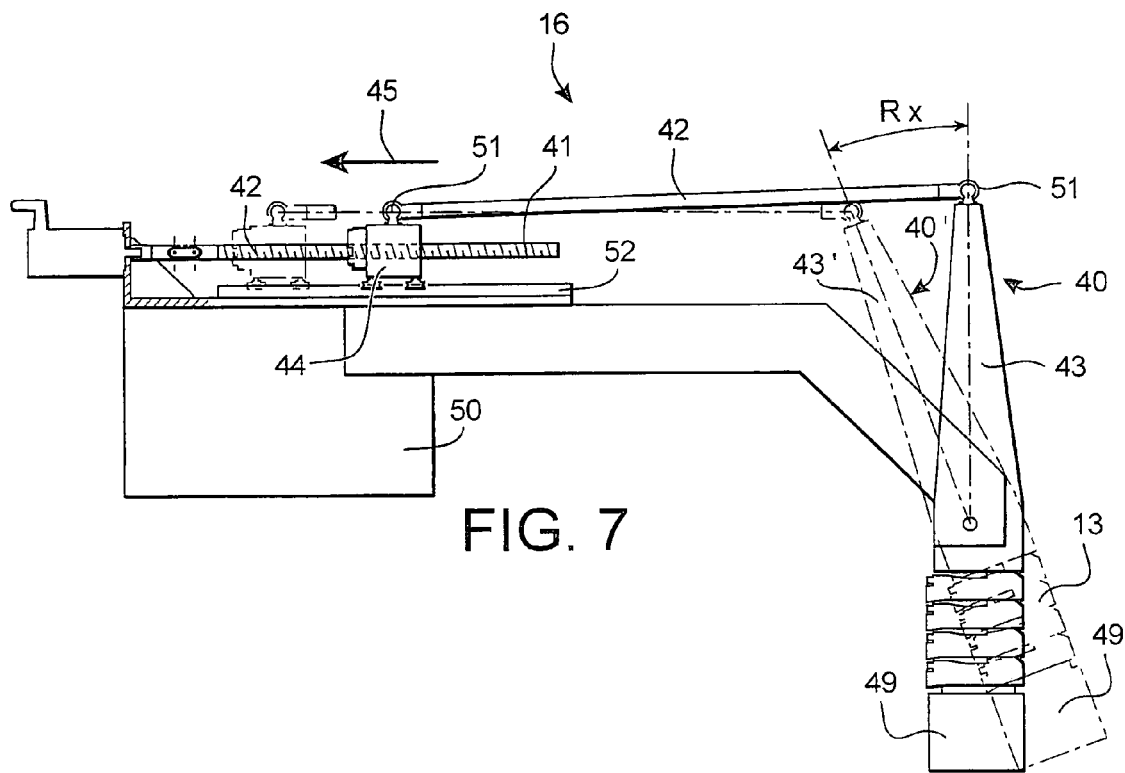
Figure 8:
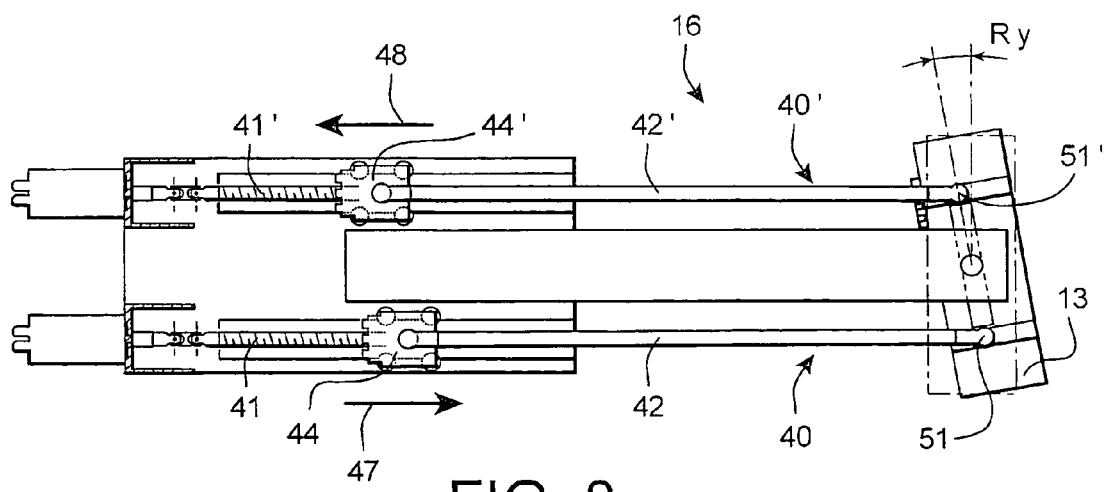

As illustrated FIGS. 6 to 8 the wrist 16 allows two rotations Rx and Ry corresponding to the fourth and fifth axes of the robot 10. This wrist 16 makes it possible to bring the axes of rotation very close to the surface of the printheads. Hence the rotation of head Ry with respect to axis $\vec{Oy}$ is made about an invariant point of the surface of the printheads. This avoids having to couple the axes of the carrier 15 with the rotation command Ry of axis $\vec{Oy}$.

The wrist 16 comprises two identical systems 40 and 40', each operating about a <<screw 41 (41')/rod 42 (42')/crank 43 (43')>> assembly linked to a mobile carriage 44 (44'). This parallel architecture uses two translations to obtain the two rotations of the printheads.

By setting in motion the two screws, the two expected rotational movements are obtained. If the two screws 41 and 41' rotate in the same direction, the carriages 44 and 44' translate (arrow 45) in the same direction, rotation Rx is made about axis $\vec{Ox}$ as illustrated FIG. 7. If on the other hand the two screws 41 and 41' rotate in reverse direction, the two carriages translate in opposite direction (arrows 47 and 48), in this case rotation Ry is made about axis $\vec{Oy}$ as illustrated FIG. 8.

The wrist 16 has a twofold function
  it acts as support for the printing assembly 13 and drying device 49, e.g. a UV lamp, enabling instantaneous drying of the ink, e.g. UV ink, sprayed onto the surface 11;
  it also enables orientation of the printing assembly 13 with respect to the surface 11. Control over this orientation makes it possible to follow the relief of this surface 11.

FIG. 7 also shows a control device 50 enabling regulation of the ink supply to the printing assembly 13.

The third axis, i.e. the axis of translation along axis $\vec{Oz}$, is used to bring the printheads close to the surface to be printed 11. More precisely, the set of wrist components comprises:
  two ball screws 41 and 41';
  two rods 42 and 42';
  two ball joint connections 51 and 51';
  two cranks 43 and 43'
  two carriages or sliders 44 and 44'
  two rails 52.

Motorisation of the Robot 10

The motorisation of the robot 10 integrates five brushless servomotors needed to move its five axes. The motorisation elements therefore relate to the following main parts:
  Five actuators and their resolvers;
  Two gears for axes $\vec{Ox}$ and $\vec{Oy}$;
  Five digital speed controllers to pilot the motor axes;

Controlling/Commanding Robot 10

Figure 9:
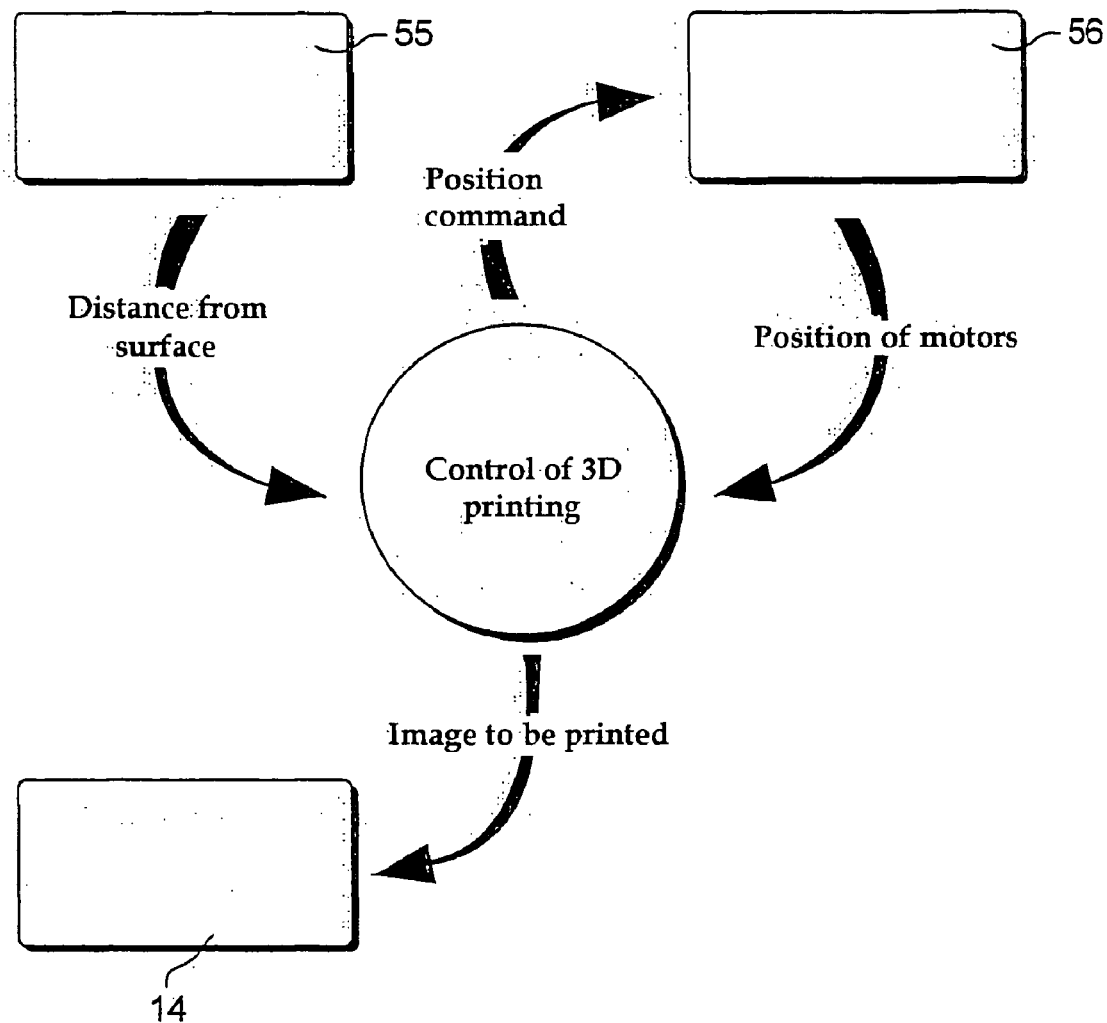
FIG. 9 illustrates the data context chart for controlling three-dimensional printing (3D)

FIG. 9 shows the data context chart of the control system for three-dimensional printing.
  The parts to be controlled or system outputs are:
  The five axes of the robot 10 to position/orientate the printing assembly 13 with respect to the surface to be printed 11;
  The printheads 14: e.g. four colour heads (Blue, Cyan, Magenta, Black);
  The drying device, e.g. a UV lamp.
  This system comprises, as input:
  Four optical sensors 55 to measure the distance between all the printheads 14 and the surface to be printed 11;
  Five encoders for the motor axes 56 to determine the displacement of the motors;
  End-of-travel sensors (two per axis) and start point sensors (one per axis).
  The overall architecture of robot controlling is structured around the following material components:
  a real-time control device;
  actuators and servo-amplifiers;
  the printing assembly;
  the ink drying device;
  a general control device;
  sensors.

A Real-Time Control Device

The role of this real-time control device is to enable development of the real-time software application specific to the simultaneous control of the five axes of the robot. This application is used to manage the displacement of the printheads at constant linear speed with respect to the surface 11. This application integrates calculation of the inverse kinematics of the robot. With this application it is possible to maintain a determined distance away from the surface 11 and to ensure the parallelism of the printheads 14 under the control of the optical sensors.

For example, this device comprises the following modules:
  a real-time central unit module (CPU) to monitor the movement of the robot 10 with a real-time operative system
  two modules to control the axes;
  a digital input-output module.

All these modules communicate via a specific industrial communication bus.

Actuators and Servo-Amplifiers

The actuators receive their power supply through their digital speed controllers-positioners. These servomotors for the axes are synchronous motors with magnets and resolver. Their speed controllers are fully digitized: resolver processing, current and speed loop. A digital speed controller is a speed servo-amplifier for autopiloted synchronous motor with use of a resolver as position and speed sensor. It ensures speed and current regulation, power command and safety functions.

Among possible actuators, two comprise a brake and protective heat probe for horizontal displacement and vertical displacement.

The Printing Assembly

The printing assembly, e.g. obtained from XAAR, uses printheads dedicated to high quality printing for large-size print surface. This printing assembly comprises a certain number of specific components related firstly to the piloting of the printheads and secondly to the ink supply for these printheads.

Figure 10:
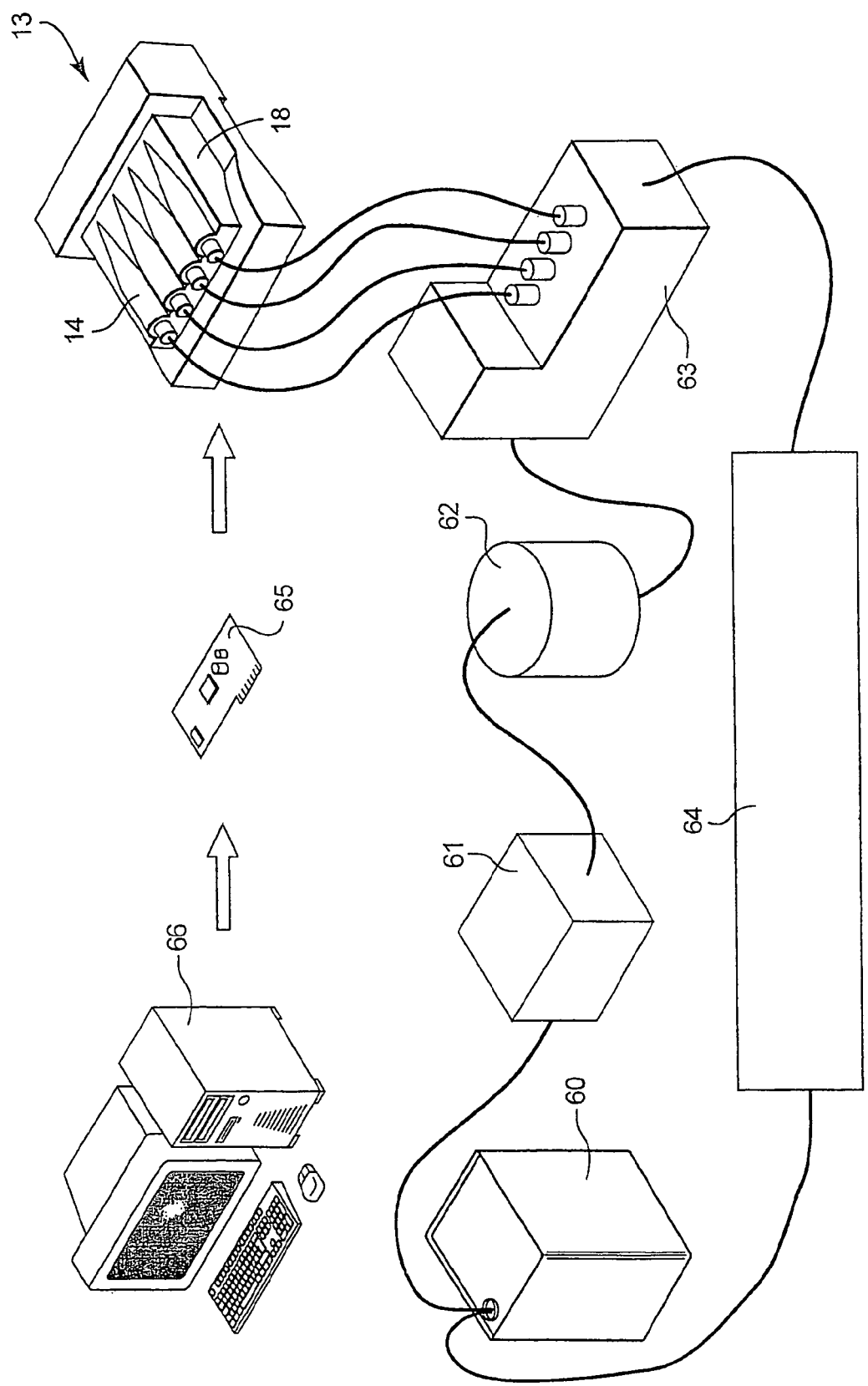
FIG. 10 illustrates all the print-related components.

FIG. 10 shows the four printheads 14 installed on their chassis. The orifices for the ink supply can be seen. The chassis used allows for precise mounting of the printheads so as to obtain almost perfect head alignment and plane of reference.

FIG. 10 also shows the integration of the other print-related components:
  an ink drum 60, a pump 61, a filter 62, a head reservoir 63, and a control unit 64 controlling the ink supply to the heads;
  an interface and printhead control card 65 for image transfer and piloting of printing from a terminal 66, e.g. PC type ("Personal Computer").

A subsidiary device provides priming of the printheads.

The Ink Drying Device

Figure 11:
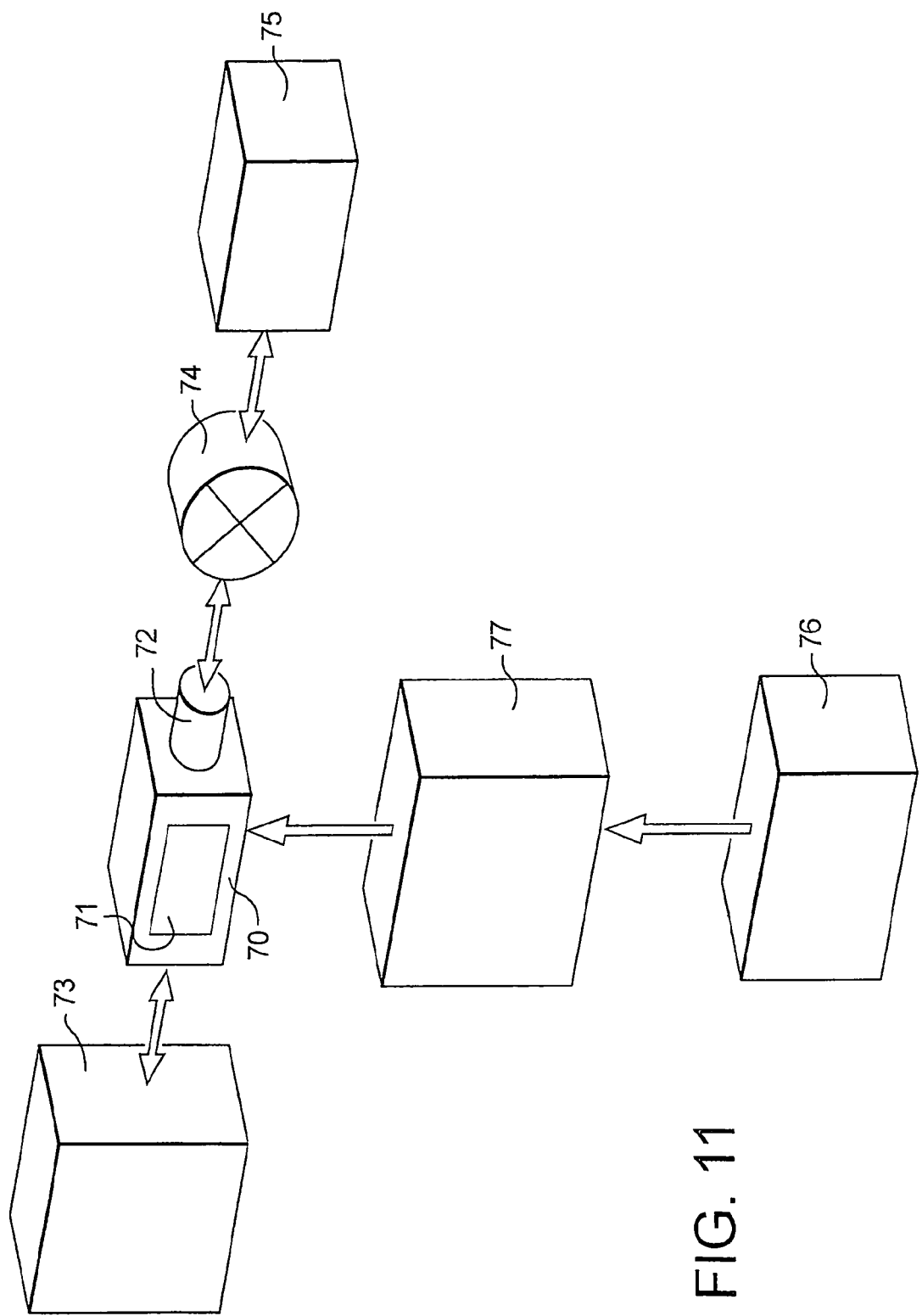
FIG. 11 illustrates all the components of the drying device.

The ink drying device provides for instantaneous drying of the ink on the surface 11 by polymerisation. The material components related to the drying device are the following, as illustrated FIG. 11:
  a UV lamp 70 provided with a shutter 71 and air extractor 72;
  a control unit 73 controlling this lamp 70;
  a motor 74 to extract hot air;
  a compressed air inlet 76 (pressure regulator 77 and filter 75).

The drying device requires a specific installation insofar as a compressed air supply 72 is needed. This supply allows the closing or opening of the shutter 71 of lamp 70; optionally a technique other than a pneumatic technique could be chosen to close or open the shutter. The supply pressure is 5 bars for example. A pressure regulator 77 is installed on the robot 10 to ensure a 5-bar supply at the input of the lamp control unit. The inlet supply of the regulator 77 lies between 5 and 10 bars. A filter 75 is also associated with this pressure regulator to filter the air and oil.

The control unit provides electric supply to the lamp 70 and opening and closing of the shutter 71 of lamp 70 by means of a solenoid valve. This control unit is interfaced with the robot control unit via command relays for piloting the shutter 71 and lamp 70.

A General Control Device

Figure 12:
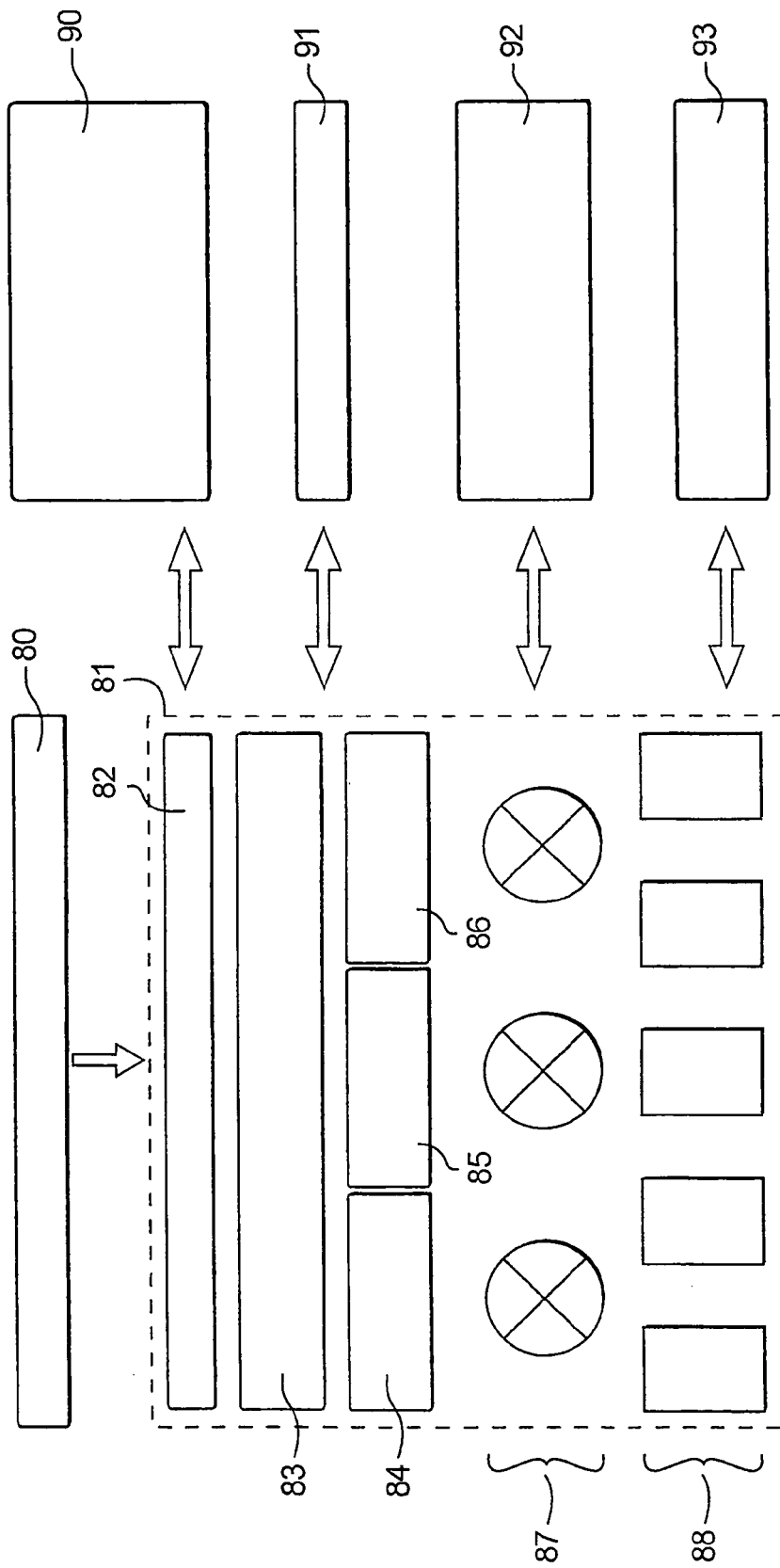
FIG. 12 illustrates the general control device of the inventive robot.

As illustrated FIG. 12, an operator command panel 80 is connected to this general control device 81 which comprises:
- a real-time control module 82,
- a sensor signal interfacing/relay and packaging module 83,
- a supply/instrumentation module 84,
- a brake feed module 85,
- a safety management module 86,
- a ventilation assembly 87,
- five digital motor speed controllers 88.

The following are connected to these different modules:
- a terminal 90 to monitor and pilot printing,
- a lamp control device 91,
- sensors 92 including optical sensors, end-of-travel sensors, start point sensors,
- an assembly 93 comprising the motors, resolvers and brakes.

This general control device 81 integrates all the members required for controlling the entire robot 10, these members concerning:
- the electric supply to the actuators;
- management of safety (emergency stop and error monitoring);
- electric supply and cabling of the sensors;
- electric supply and management of the two brakes on the motor axes concerned;
- the interface with the drying device to control the latter;
- the general electric supply to all components;
- the cabling of this control device and all its inputs-outputs for software management of all the components.

Figure 13:
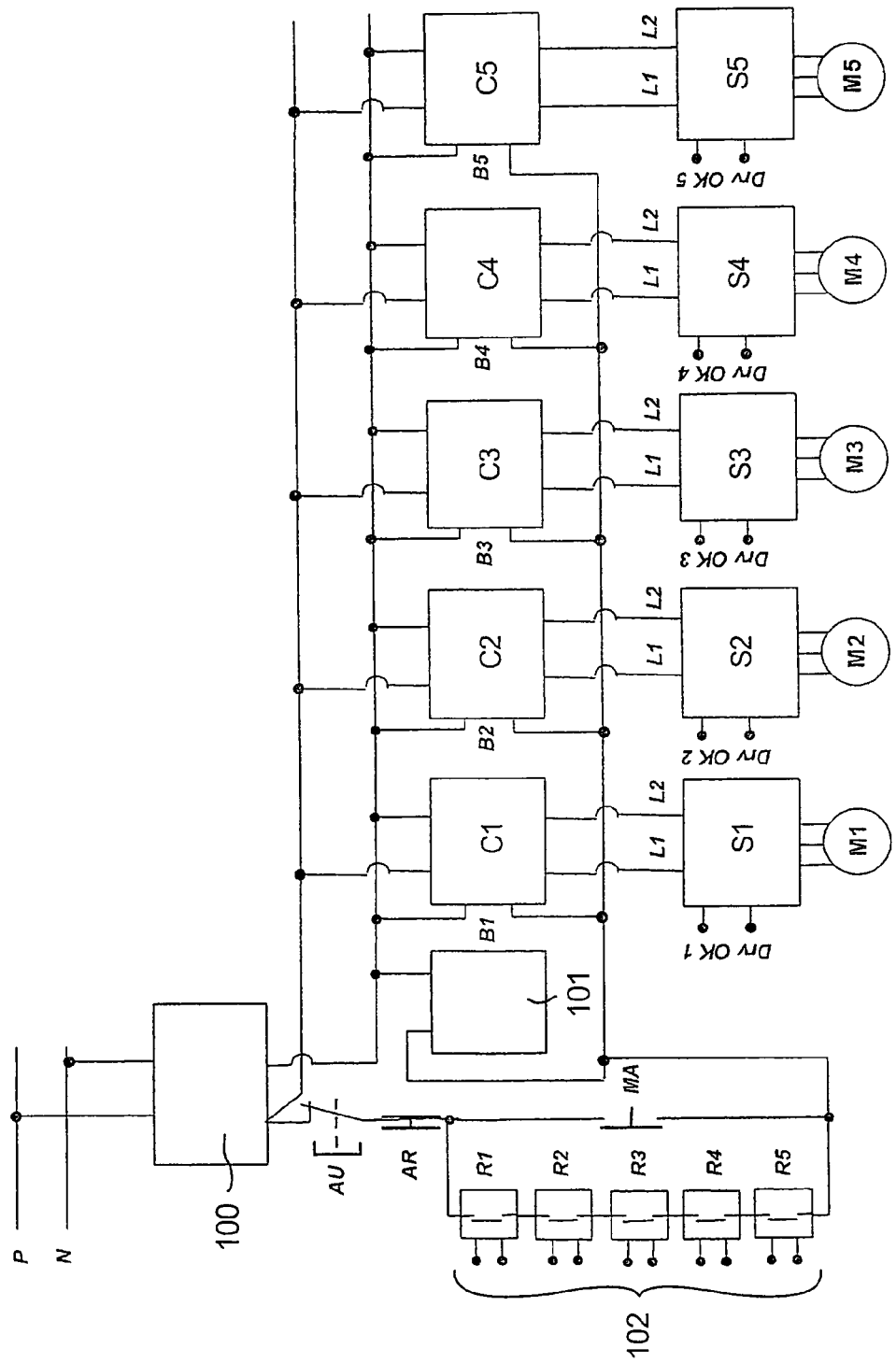
FIG. 13 illustrates the supply to the actuators of the inventive robot.

The basic circuit for cabling the electric supply to the servo-amplifiers is shown FIG. 13.

This figure shows:
- a circuit breaker 100,
- a brake feed 101,
- contactors C1 to C5 with their respective windings B1 to B5,
- servomechanisms S1 to S5,
- motors M1 to M5,
- contact relays R1 to R5 piloted by the output 102 of servomechanism n° i with:
- P, N: Phase, Neutral of a monophase 240C AC supply,
- MA: Start-up,
- AR: Stop,
- AU: Emergency stop.

Sensors

The robot instrumentation consists of two types of sensors:
- proprioceptive sensors to receive internal data on start point and end of travel;
- exteroceptive sensors determining the distance between the printheads and the surface to be printed 11.

The optical sensors used to measure the distance from the surface 11 are linear laser sensors fixed directly onto the chassis of the printheads.

The Software Architecture of the Robot 10

The software application developed to control the entire robot 10 is structured around two separate computer stations:
- a first computer terminal based on the real-time control device with an on-board real-time operating system;
- a second computer terminal based on the use of a computer of PC type ("Personal Computer") in a Windows environment for example. This second terminal may or may not be of on-board type.

Each of these terminals has a separate role within the overall control of the robot 10.

The first computer terminal is dedicated solely to control of the print robot movements. The developed software integrates the servo-displacement of the printheads with respect to the surface 11. This servo control imposes rectilinear movement of all the printheads (from bottom to top) with a constant linear speed (maximum 0.51 m/s) whilst maintaining a fixed distance from the surface 11 (this distance is less than 3 mm to guarantee good print quality).

The second computer terminal is dedicated to monitoring the print robot 10. The software developed in a Windows environment ensures several functions among which:
- coordination between movement of the robot 10 and printing operations (communication with the real-time control device for synchronisation);
- processing of the digital image to be printed (dividing and quadtone breakdown);
- man-machine interfacing.

The general control algorithm of the robot is as follows:

```
Loading the digital image to be printed
Dividing the image into N strips of width 500 pixels
Decomposing each strip into 4 monochrome binary images (YCMB
  decomposition)
Setting up the robot
Preheating the UV lamp
Positioning the carrier with respect to the surface
Positioning all the printheads with respect to the original image
START of printing
WHILE No__Strip__In__Progress<N
    DO
        START Servo control of vertical robot movement
        Open shutter of UV lamp
        START Printing of strip in progress
        IF distance/medium <3mm
            THEN Servo control OK
        IF NOT correction of distance/medium
        WHILE (End__Of__strip not reached) OR Safety__OK
        IF (End__Of__strip not reached)
            THEN
                Stop Printing
                Close shutter of UV lamp
                END Servo control
        IF NOT
            Treatment of problem
        Displacement to start of following strip
Printing OK : Return to rest position of robot
```

Example of Embodiment

With the invention it is possible to install itinerant or fixed printing sites. If the example of a truck is taken, printing can for example be proposed on road service areas in the same manner as vehicle washing facilities. Printing could relate to advertising graphics, the logo of the ordering company or simply a decorative image. The image to be printed is available on a digital medium (disc, USB key—"Universal Serial Bus", CD-ROM ("Compact Disc Read Only Memory"), . . . etc.).

The word "itinerary" indicates that the inventive robot 10 can be moved to different sites throughout the year, for periods of several months, which could be fixed having regard to dates and times of traffic.

For printing on trucks, the driver would therefore have the opportunity of leaving the vehicle <<during a break>>. The printing process using the inventive robot 10 can then be set in operation.

The media to be printed may be of highly varied sizes. Extreme sizes could be surfaces of 3 m×18 m (height× length).

The media to be printed may be of two different types:
sheet metal (isothermal)
vinyl (for tarpaulins).

The surfaces have little deformation, and if they are deformed the radii of curvature are very large.

Print resolution is 180 dpi (dot per inch) which is equivalent to 180 dots per 25.4 mm for a single pass and 360 dpi for two pass printing. Generally, for large format printing for outside displays, a resolution in the order of 75 dpi is sufficient.

The printing is in quadtone, the four colours being cyan, magenta, yellow and black. To obtain printed colours that are identical to the colours of the model, a white primer layer may be previously applied on the surface 11.

With the prototype, the printing of an image is conducted from left to right, from bottom to top in vertical strips 70 mm wide.

The maximum printing speed is 2.142 $m^2$/min with a resolution of 180 dpi.

REFERENCES

[1] FR 2 795 662
[2] EP 0 970 811

The invention claimed is:

1. A print robot for large format three-dimensional printing on a fixed surface, comprising an inkjet printing assembly, means for displacing and orientating this printing assembly along several axes, at least one control unit controlling these means and a drying device for the ink sprayed onto said surface, wherein said robot is a print robot with five motorized axes and wherein the displacement and orientation means comprise:
    a carrier with three degrees of freedom in translation, which ensures positioning of the printing assembly allowing its horizontal, vertical and depth translation, wherein the carrier comprises:
        a first mobile carriage provided with a driving system moving on two horizontal rails,
        a beam fixed perpendicular to the first mobile carriage, a second mobile carriage provided with a driving system moving on two vertical rails mounted on this beam, and
        a slide fixed perpendicular to the second mobile carriage, a mobile platform moving along this slide; and
    a wrist with two degrees of freedom in rotation which supports and ensures the orientation of the printing assembly allowing its rotations (Rx, Ry) along two perpendicular axes.

2. A robot as claimed in claim 1, wherein the wrist comprises two identical systems screws/rods/cranks each linked to a mobile carriage.

3. A robot as claimed in claim 2, wherein the wrist supports the ink drying device.

4. A robot as claimed in claim 3, comprising five servomotors respectively associated with the five axes of this robot.

5. A robot as claimed in claim 4, which as input comprises:
    several optical sensors to measure the distance between the printing assembly and the surface to be printed,
    five encoders for the motor axes to determine the displacement of the servomotors,
    two end-of-travel sensors and one start point sensor respectively associated with each axis of the robot.

6. A robot as claimed in claim 5, comprising a real-time control device which comprises:
    a central unit module,
    at least one module to control the axes,
    a digital input-output module.

7. A robot as claimed in claim 6, comprising a general control device which includes:
    a real-time control module,
    a sensor signal interfacing/relay and packaging module,
    a supply/instrumentation module,
    a brake feed module,
    a safety management module,
    a ventilation assembly,
    five digital motor speed controllers.

8. A robot as claimed in claim 7, comprising:
    a first computer terminal dedicated to control of the movements of this robot,
    a second computer terminal dedicated to monitoring the robot, including:
    coordination between displacement of the robot and the printing operation,
    processing the digital image to be printed,
    man-machine interfacing.

9. A robot as claimed in claim 1, wherein the printing assembly comprises at least one printing block provided with several printing heads using inks of different colors.

10. A robot as claimed in claim 9, wherein each printing block comprises four printheads respectively using yellow, cyan, magenta and black inks.

11. A robot as claimed in claim 9, wherein the inks are ultraviolet drying inks.

12. A printing process, which after a prior step to digitize the image and divide it into strips of determined width, comprises the following steps:
    positioning a medium with respect to at least one robot as claimed in claim 1,
    initial setting of said at least one robot and positioning its/their head(s) with respect to the surface of the medium, at the point where printing of the image is to start,
    printing the image on said surface with successive printing of the different vertical strips forming the image,
    return to a rest configuration.

13. A process as claimed in claim 12, which comprises a prior surface preparation step so as to make it clean and uniformly white.

14. A process as claimed in claim 12, wherein printing starts at the lower left-hand corner of the surface.

15. A process as claimed in claim 12, wherein the width of the vertical strips is approximately 7 cm.

16. A print robot for large format three-dimensional printing on a fixed surface, comprising an inkjet printing assembly, means for displacing and orientating this printing assembly along several axes, at least one control unit controlling these means and a drying device for the ink sprayed onto said surface, wherein said robot is a print robot with five motorized axes and wherein the displacement and orientation means comprise:

a carrier with three degrees of freedom in translation, which ensures positioning of the printing assembly allowing its horizontal, vertical and depth translation, a wrist with two degrees of freedom in rotation which supports and ensures the orientation of the printing assembly allowing its rotations (Rx, Ry) along two perpendicular axes, wherein the wrist comprises two identical systems screws/rods/cranks each linked to a mobile carriage, wherein the wrist supports the ink drying device, said robot comprising five servomotors respectively associated with the five axes of this robot, said robot comprising as input:

several optical sensors to measure the distance between the printing assembly and the surface to be printed, five encoders for the motor axes to determine the displacement of the servomotors, two end-of-travel sensors and one start point sensor respectively associated with each axis of the robot.

17. A robot as claimed in claim 16, comprising a real-time control device which comprises:

a central unit module, at least one module to control the axes, a digital input-output module.

18. A robot as claimed in claim 17, comprising a general control device which includes:

a real-time control module, a sensor signal interfacing/relay and packaging module, a supply/instrumentation module, a brake feed module, a safety management module, a ventilation assembly, five digital motor speed controllers.

19. A robot as claimed in claim 18, comprising:

a first computer terminal dedicated to control of the movements of this robot, a second computer terminal dedicated to monitoring the robot, including:

coordination between displacement of the robot and the printing operation, processing the digital image to be printed, man-machine interfacing.

* * * * *